Aug. 1, 1950     A. W. GILMORE ET AL     2,516,864
METHOD OF MAKING HOSE FROM ELASTOMERIC COMPOSITION
Filed Aug. 24, 1948     3 Sheets-Sheet 1

Inventors:
Arville W. Gilmore,
Glenn Koger,
by *Alfred T. Robst*
Their Attorney.

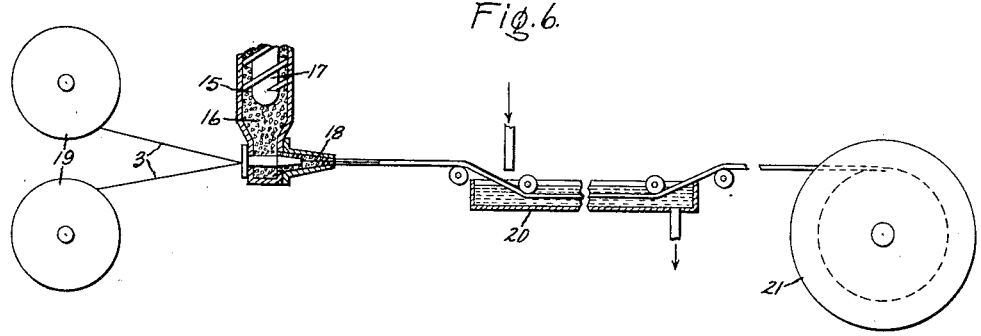
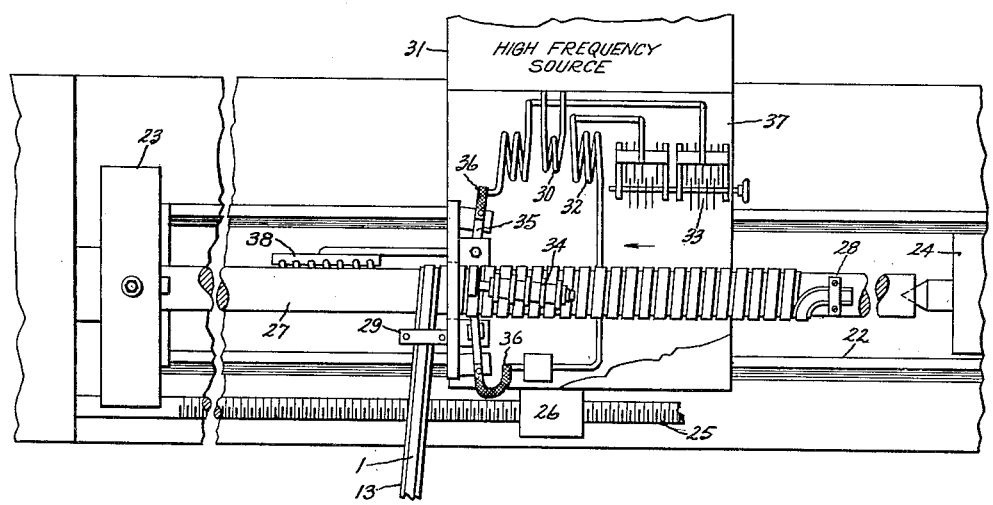
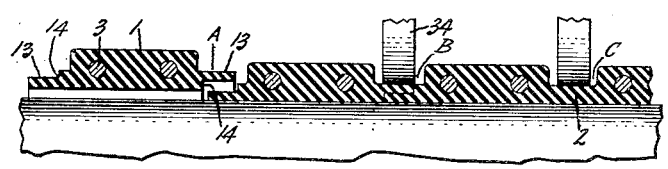
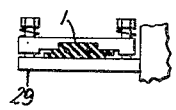

Aug. 1, 1950  A. W. GILMORE ET AL  2,516,864
METHOD OF MAKING HOSE FROM ELASTOMERIC COMPOSITION
Filed Aug. 24, 1948  3 Sheets-Sheet 3
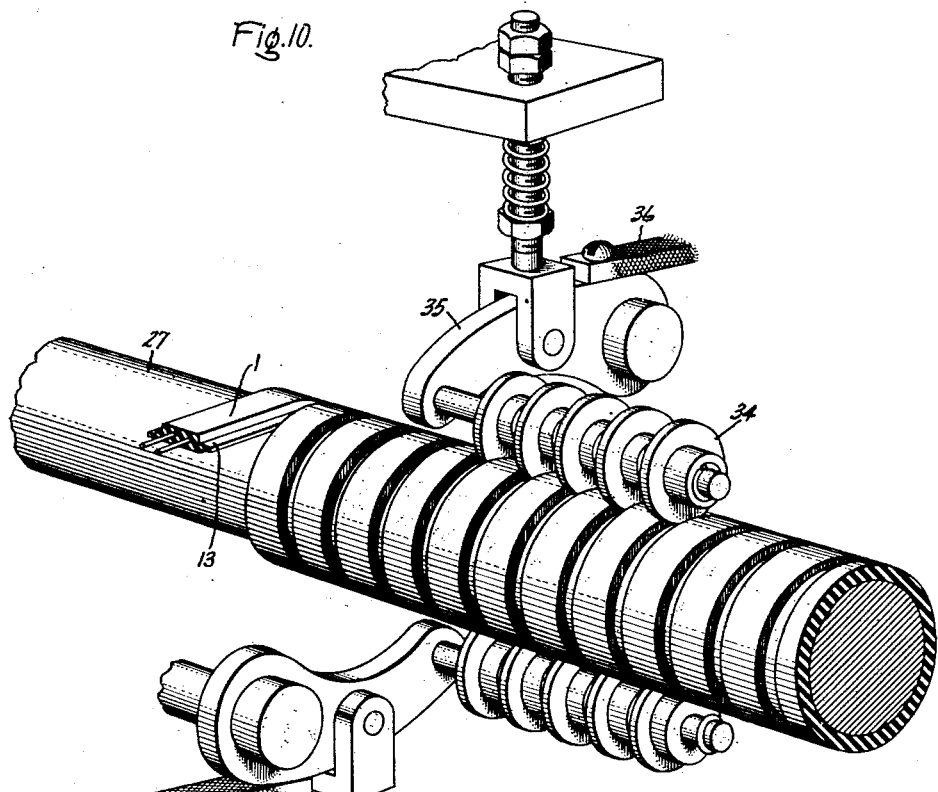
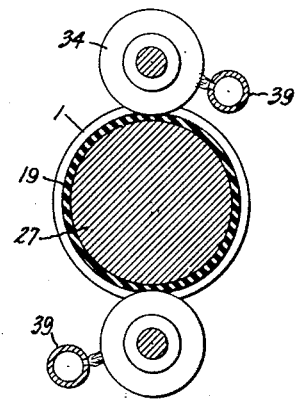
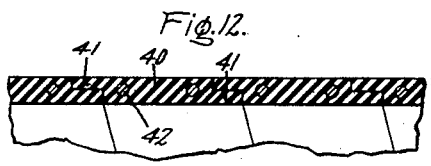
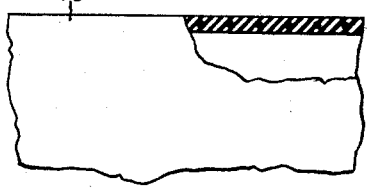
Inventors:
Arville W. Gilmore,
Glenn Koger,
by Alfred E. Robst
Their Attorney.

Patented Aug. 1, 1950

2,516,864

UNITED STATES PATENT OFFICE 2,516,864

METHOD OF MAKING HOSE FROM ELASTOMERIC COMPOSITION

Arville W. Gilmore and Glenn Koger, Bridgeport, Conn., assignors to General Electric Company, a corporation of New York Application August 24, 1948, Serial No. 45,836

14 Claims. (Cl. 154—8)

The present invention relates to hoses such as are used for conveying fluids.

A primary object of our invention is to provide an improved method by the use of which hose, especially flexible hose reinforced by a spirally extending strip of metal or other suitable reinforcing material, may be manufactured expeditiously and at relatively low cost from an extrudable elastomeric composition.

Other objects and the advantages of our invention will appear from the following specification, and for a consideration of what we believe to be novel and our invention, attention is directed to the following specification and to the claims appended thereto.

Figure 1:
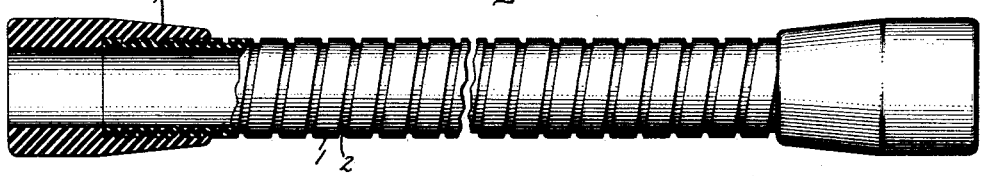
Figure 2:
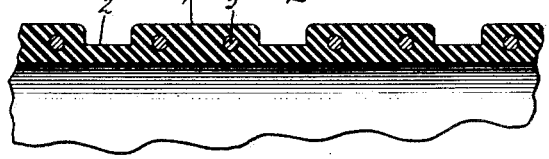
Figure 3:
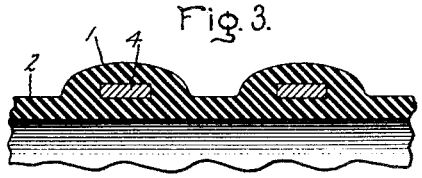
Figure 4:
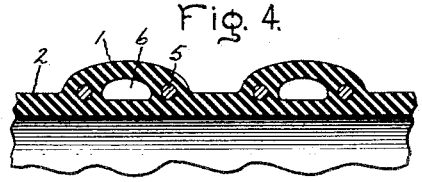
Figure 5:
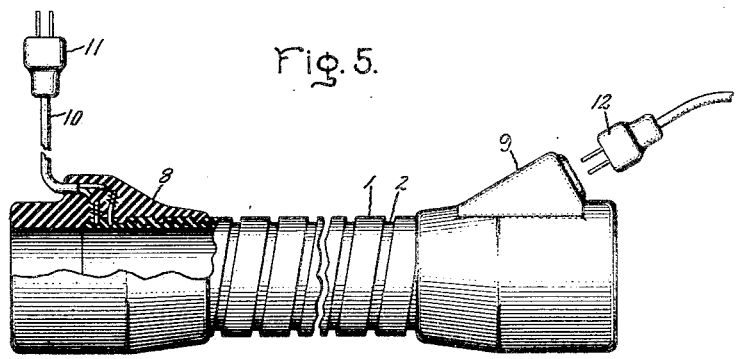

In the drawings, Fig. 1 is a side elevation, partly in section, of a hose made in accordance with our improved method; Fig. 2 is a fragmentary sectional view on a larger scale of a short length of the hose shown in Fig. 1; Figs. 3 to 5 are views showing other forms of hose which may be made utilizing our improved method; Fig. 6 is a diagrammatic view showing an initial step in the manufacture of a hose; Fig. 7 is a top plan view illustrating the forming of the hose; Fig. 8 is a detailed sectional view on a larger scale illustrating steps in the formation of the hose; Fig. 9 is a detail view of a guide; Fig. 10 is a perspective view on a larger scale of a part of the mechanism shown in Fig. 7; Fig. 11 is a detail sectional view of a modification; and Figs. 12 and 13 are detail sectional views of another form of hose which may be made utilizing our method.

Our method of manufacturing a hose comprises forming, preferably by extrusion, a strip comprising a continuous rib having fins along its longitudinal edges of a fusible elastomeric composition, winding said strip spirally with the fins of adjacent turns overlapping and fusing the fins together to form an integral structure. The ribs are preferably relatively thick in cross-section compared to the fins and preferably are made stiff and self-supporting to render the hose noncollapsible. To this end, the ribs may, moreover, be reinforced by one or more metal strips or wires or by continuous inserts of some other suitable material. The overlapping fins are fused together by the application of heat in any suitable manner in order to form the adjacent spiral turns of the strip into an integral structure. Preferably, we fuse the fins together simultaneously with the spiral winding of the strip. Preferably also, we carry out the fusing of the fins by electronic sewing, i. e. by heating the overlapping fins by the use of high frequency electrical current. By our method, the resultant hose comprises spiral ribs united at their side edges by relatively thin webs. Such a hose is flexible, the webs serving to lend flexibility to the hose, so that it may be bent readily.

The thickness of the web and its width in an axial direction may vary considerably depending on the flexibility desired and the internal or external pressure to which the hose will be subjected. An application of our invention is in the manufacture of hoses for vacuum cleaners. Here the pressure across the hose wall is relatively small and in a hose for this use having an external diameter of the order of 1½ inches we have found a web thickness of the order of $1/32$ inch and an axial width of the order of ⅛ inch satisfactory, the rib thickness being of the order of $3/32$ inch and its axial width of the order of ⅜ inch. Such a hose is quite flexible and can be bent readily on a curvature of the order of 3 inches radius.

Referring to the drawings, particularly Figs. 1 and 2, 1 indicates the ribs of the hose and 2 indicates the webs. In Figs. 1 and 2, the ribs are shown as being reinforced by two continuous wires 3 formed from stiff metal, for example, piano wire; also, the ribs are shown as being rectangular in cross section, although they may have other suitable cross-sectional contour. The wires 3 may be used as electrical conductors if desired. In Fig. 3, the ribs 1 are rounded on their outer sides and are shown as being reinforced by a single flat reinforcing strip 4 which may be formed of a suitable metal, such as steel or copper alloy or from a suitable non-metallic strip, such as a continuous strip of hard fiber, fibrous cord or the like. In Fig. 4, the ribs 1 are shown as being reinforced by suitable wires 5 and as being provided with a continuous spiral passage or conduit 6, through which, if desired, a suitable liquid or gas may be circulated. By our improved method hose of any suitable length may be made and its ends may be finished in any suitable manner to provide means by which a hose may be connected to a piece of apparatus or by which tools or nozzles may be connected to an end of the hose. In Fig. 1, the ends of the hose are provided with molded-on sleeves 7 which may be formed from rubber, for example. In Fig. 5, the ends of the hose are provided with molded-on sleeves 8 and the ends of the two reinforcing wires are shown at one end of the hose as terminating in a female electrical connector 9, the other ends being connected to the conductors of an electrical cord 10 which terminates in a connector plug 11. At 12 is an electrical plug which may be connected to connector 9. When used as vacuum cleaner hoses, one end of the hose, as shown in Figs. 1 and 5 may be provided with means for connecting it to a vacuum cleaner casing and the other end provided with means to which suction tools may be connected. In connection with the Fig. 5 construction, plug 11 may be connected to a source of power and plug 12 may be a part of a tool connected to the end of the hose, the plug supplying current to a light on the tool, to an electric motor for a motor-driven brush in the tool, or to some other electrical device.

Hoses made by our improved method may have a cross-sectional contour other than round and may be of any desired length. They may be used wherever found applicable. A hose as shown in Fig. 4 may pass two fluids, one through the hose and the other through passage 6, an exchange of heat taking place between the fluids in the two passages if desired. At the discharge end of the hose, the two fluids may be mixed with each other or they may be discharged separately.

According to our improved method as utilized in constructing a hose of the type shown on Sheet 1 of our drawings, we first form, preferably by extrusion, a continuous strip of elastomeric composition comprising rib 1 having relatively thin fins 13 along its two side edges (see Figs. 8 and 10). The fins are positioned adjacent what may be termed the inner sides of the rib and are offset relatively to each other by amounts equal to the thickness of the fins whereby shoulders 14 are provided. Within the rib is a reinforcing means, such as the wires 3 of Fig. 2. The strip may be formed by utilizing a known construction of extruder as shown diagrammatically in Fig. 6, 15 being the extrusion barrel, 16 being the material to be extruded, 17 being the feed screw, and 18 being the extrusion die. The reinforcing means such as the wires 3 may be fed to the extruder from a pay-off or pay-off reels 19. After leaving the extruder, the strip may be passed through a water cooling bath 20 and be wound on a take-up reel 21. The die 18 is shaped to give the desired cross-sectional contour to the strip. Extruders of this type are well known in connection with the manufacture of insulated wire and cable. There construction and operation need no further description for an understanding of the first step of our method.

Next we take the strip and wind it spirally on a mandrel with the fins 13 overlapping as indicated particularly at A and B in Fig. 8, after which the fins are united by being fused together to form the web 2 as indicated at C in Fig. 8.

The strip may be wound on the mandrel by utilizing any suitable tool or machine. In Fig. 7, we have shown it as being wound by using a lathe. In Fig. 7, where a known type of lathe is shown, 22 indicates the lathe bed ways, 23 the lathe head, 24 the tail stock, and 25 the lead screw. The lathe carriage which is slid along the ways by the lead screw is indicated at 26. In winding a strip, a mandrel 27 is mounted in the lathe between the lathe head and the tail stock and the end of the strip is fastened to the end of the mandrel adjacent the tail stock as indicated at 28, a reel with the strip wound thereon being suitably mounted on the floor adjacent the lathe on a reel holder. The lathe is then operated to turn the mandrel to wind the strip thereon, the strip being moved longitudinally along the mandrel by the lead screw. The strip is fed to the mandrel through a suitable guide 29, as shown in side elevation in Fig. 9, attached to the lathe carriage. The guide is formed in two sections which are spring pressed toward each other, the springs being adjustable so that the strip has a snug fit in the guide.

As the strip is being wound on the mandrel or after it has been wound thereon but before being removed from the mandrel, the fins 13 are united by fusion. Heat to effect fusion of the fins may be supplied in any suitable way; preferably the fins are united by electronic sewing, i. e. heating the webs by the use of high frequency electrical current. A form of electronic sewing mechanism is shown somewhat diagrammatically in Figs. 7 and 10 wherein an output coil or link coil 30 connected to a high frequency source 31 supplies high frequency current to a circuit including load coils 32, condenser 33, and sets of rollers 34 which ride against the fins 13 as best shown in Fig. 10. In the present instance, two sets of rollers 34 are shown, each set comprising five rollers, but more than two sets of rollers, for example four sets, may be used if found desirable. The individual rollers of each set are spaced apart and positioned at such an angle to the axis of the mandrel that they roll in the grooves between the ribs.

Each set of rollers is carried by a pivoted spring biased arm 35, as shown clearly in Fig. 10. Electrical connections for the arms are indicated at 36. The electronic sewing mechanism is mounted on an insulating plate 37 which in turn is mounted on the lathe carriage 26 so as to move therewith.

In some instances, it may be desirable to preheat the mandrel, and for this purpose, a gas burner carried by the lathe carriage is indicated at 38. Means other than a gas burner, for example, electrical means may be used for preheating the mandrel.

After the strip has been wound on the mandrel and the fins united by fusion, the mandrel may be removed from the lathe, after which the completed hose may be removed from the mandrel. In the completed hose, no seam will appear at the point where the fins are united, the fusion serving to unite the fins to form an integral web.

As stated above, means other than electronic sewing may be utilized for supplying heat for fusing and uniting the webs. In Fig. 11 is shown a modification wherein the rollers 34 are heated by gas burners 39. In Fig. 11, the mandrel is indicated at 27, the rib of a hose at 1 and a fin at 19.

Our improved method may be utilized in manufacturing spirally reinforced hose of extrudable elastomeric composition which is substantially uniform in wall thickness. This is illustrated in Figs. 12 and 13. In Fig. 12 is shown a strip formed from extrudable elastomeric composition comprising a rib 40 having fins 41 along its opposite side edges offset with respect to each other, the fins having a thickness equal substantially to one-half the thickness of the rib. The rib is provided with continuous longitudinally extending reinforcing members 42. Such a strip may be formed and wound spirally on a mandrel after the manner described above with the fins overlapping to form hose wall of uniform thickness after which the fins are fused together to provide a hose 43 as shown in Fig. 13 wherein the finished product comprises a hose wall of extrudable elastomeric composition reinforced by continuous spirally extending reinforcing means embedded therein.

In carrying out our invention, any elastomeric composition suited for the use to which the hose is to be put may be used. For vacuum cleaner hoses and hoses for other uses of a similar character, we have found a plasticized polyvinyl halide resin, more particularly plasticized polyvinyl chloride, to be satisfactory. Such a material provides a hose which is strong, chemically inert to most substances, has excellent wear-resisting qualities and lends itself well in carrying out our improved method of manufacture.

Other plasticized halide resins which may be used are polyvinl bromide, polyvinl fluoride, etc.

Other examples of extrudable elastomeric compositions which we may use in carrying out our invention are: cellulose polymers, vinyl polymers and copolymers, butadiene polymers and copolymers, chloroprene polymers and copolymers, polyacrylates, natural rubbers, alkyds, polyesters, polyamides (super, etc.), polystyrene and butyl rubbers.

Where it is found desirable or necessary, any of the foregoing elastomeric compositions may be rendered more suitable by the addition of plasticizers, stabilizers, softeners and compounding ingredients, such as dyes, fillers, pigments, lubricants, etc., as is well understood by those skilled in this art.

Flexible hoses formed as shown in Figs. 1 to 5 of this application are not claimed herein as they form subject matter of our application Serial No. 45,837, filed of even date herewith, and assigned to the same assignee as the instant application. Application Serial No. 45,837 is now abandoned.

What we claim as new and desire to secure by Letters Patent of the United States is:

1. The method of manufacturing a hose which comprises forming a strip comprising a continuous rib having fins along its longitudinal edges from elastomeric composition, winding said strip spirally with the fins of adjacent turns overlapping, and fusing the fins together by the application of heat to form an integral structure.

2. The method of manufacturing a hose which comprises forming a strip comprising a continuous rib having fins along its longitudinal edges from elastomeric composition, winding said strip spirally with the fins of adjacent turns overlapping, and electronically sewing said fins together to form an integral structure.

3. The method of manufacturing a hose which comprises forming a strip comprising a continuous rib having fins along its longitudinal edges from elastomeric composition, winding said strip spirally with the fins of adjacent turns overlapping, and simultaneously fusing the fins together by the application of heat to form an integral structure.

4. The method of manufacturing a hose which comprises forming a strip comprising a continuous rib having fins along its longitudinal edges from elastomeric composition, winding said strip spirally with the fins of adjacent turns overlapping, and simultaneously electronically sewing said fins together.

5. The method of manufacturing a hose which comprises forming a strip comprising a continuous rib having fins along its longitudinal edges from elastomeric composition, and with a reinforcing member embedded in the rib, winding such strip spirally with the fins of adjacent turns overlapping, and fusing the fins together by the application of heat to form an integral structure.

6. The method of manufacturing hose which comprises extruding elastomeric composition around a reinforcing member to provide a continuous strip comprising a reinforced rib having fins on its longitudinal edges, winding said strip spirally with the fins of adjacent turns overlapping, and fusing the fins together by the application of heat to form an integral structure.

7. The method of manufacturing hose which comprises extruding elastomeric composition around one or more reinforcing wires to provide a continuous strip comprising a wire reinforced rib having fins on its longitudinal edges, winding said strip spirally with the fins of adjacent turns overlapping, and fusing the fins together by the application of heat to form an integral structure.

8. The method of manufacturing hose which comprises extruding elastomeric composition around one or more reinforcing wires to provide a continuous strip comprising a wire reinforced rib having fins on its longitudinal edges, winding said strip spirally with the fins of adjacent turns overlapping, and simultaneously fusing the fins together by the application of heat to form an integral structure.

9. The method of manufacturing hose which comprises extruding elastomeric composition around one or more reinforcing wires to provide a continuous strip comprising a wire reinforced rib having fins on its longitudinal edges, winding said strip spirally with the fins of adjacent turns overlapping, and simultaneously electronically sewing said fins together to form an integral structure.

10. The method of manufacturing a flexible hose which comprises forming strips comprising a continuous rib having fins along its longitudinal edges from elastomeric composition, the fins being relatively thin as compared to the thickness of the rib, winding such strips spirally with the fins of adjacent turns overlapping, and fusing the fins together by the application of heat to form an integral structure.

11. The method of manufacturing a flexible hose which comprises forming strips comprising a continuous rib having fins along its longitudinal edges from elastomeric composition, the fins being relatively thin as compared to the thickness of the rib and with a reinforcing member embedded in the rib, winding such strips spirally with the fins of the adjacent ribs overlapping and fusing the fins together by the application of heat to form an integral structure.

12. The method of manufacturing a flexible hose which comprises extruding elastomeric composition around a reinforcing member to provide a continuous strip comprising a reinforced rib having relatively thin fins on its longitudinal edges, winding said strips spirally with the fins of adjacent turns overlapping, and fusing the fins together by the application of heat to form an integral structure.

13. The method of manufacturing a flexible hose which comprises extruding elastomeric composition around a reinforcing member to provide a continuous strip comprising a reinforced rib having relatively thin fins on its longitudinal edges, said fins being offset relatively to each other by an amount equal substantially to their thickness, winding said strips spirally with the fins of adjacent turns overlapping, and fusing the fins together by the application of heat to form an integral structure.

14. The method of manufacturing flexible hose which comprises extruding elastomeric composition around one or more reinforcing wires to provide a continuous strip comprising a wire reinforced rib having relatively thin fins on its longitudinal edges, winding said strips spirally with the fins of adjacent turns overlapping, and fusing the fins together by the application of heat to form an integral structure.

ARVILLE W. GILMORE.
GLENN KOGER.

REFERENCES CITED

The following references are of record in the file of this patent:

UNITED STATES PATENTS

| Number | Name | Date |
|---|---|---|
| 1,519,522 | Weigel | Dec. 16, 1924 |
| 1,940,145 | Raiche | Dec. 19, 1933 |
| 2,146,559 | Berkowitz | Feb. 7, 1939 |
| 2,247,197 | Graves | June 24, 1941 |
| 2,358,909 | Davis | Sept. 26, 1944 |
| 2,394,762 | Geraty | Feb. 12, 1946 |
| 2,398,876 | Bailey | Apr. 23, 1946 |

Certificate of Correction

Patent No. 2,516,864 August 1, 1950

ARVILLE W. GILMORE ET AL.

It is hereby certified that error appears in the printed specification of the above numbered patent requiring correction as follows:

Column 5, line 36, strike out the words and period "Application Serial No. 45,837 is now abandoned.";

and that the said Letters Patent should be read as corrected above, so that the same may conform to the record of the case in the Patent Office.

Signed and sealed this 14th day of November, A. D. 1950.

[SEAL]

THOMAS F. MURPHY,
*Assistant Commissioner of Patents.*